United States Patent
Kato et al.

(10) Patent No.: US 6,770,130 B2
(45) Date of Patent: Aug. 3, 2004

(54) SILICA COMPOSITE OXIDE PARTICLES AND METHOD OF PRODUCING THE SAME

(75) Inventors: Hiroshi Kato, Yamaguchi-ken (JP); Michimasa Tamura, Yamaguchi-ken (JP); Makoto Kameda, Yamaguchi-ken (JP)

(73) Assignee: Tokuyama Corporation, Yamaguchi (JP)

( * ) Notice: Subject to any disclaimer, the term of this patent is extended or adjusted under 35 U.S.C. 154(b) by 0 days.

(21) Appl. No.: 10/325,962

(22) Filed: Dec. 23, 2002

(65) Prior Publication Data

US 2003/0133890 A1 Jul. 17, 2003

(30) Foreign Application Priority Data

Dec. 27, 2001 (JP) .......................................... 2001-397283

(51) Int. Cl.⁷ .............................................. C04B 14/04
(52) U.S. Cl. ...................... 106/481; 106/434; 106/435; 106/436; 106/437; 106/438; 106/446; 106/450; 106/454; 106/457; 106/475; 106/481; 106/490
(58) Field of Search ................................ 106/434–438, 106/446, 450, 454, 457, 475, 481, 490; 428/400 T

(56) References Cited

U.S. PATENT DOCUMENTS

| 4,567,030 A | * | 1/1986 | Yuasa et al. ................. 423/326 |
| 5,248,556 A | * | 9/1993 | Matijevic et al. ........... 428/403 |
| 5,846,310 A | * | 12/1998 | Noguchi et al. ............. 106/482 |

* cited by examiner

*Primary Examiner*—C. Melissa Koslow
*Assistant Examiner*—Shalie Manlove
(74) *Attorney, Agent, or Firm*—Sherman & Shalloway

(57) ABSTRACT

Silica composite oxide particles comprising silica and a metal oxide other than silica, the content of the metal oxide other than silica being from 30 to 50 mol %, and a coefficient of variation in the particle diameter being not larger than 30%. The silica composite oxide particles contain metal oxides other than silica in an amount of not smaller than 30 mol %, which could not be produced thus far, and feature excellent spherical shape and excellent monodispersion property.

4 Claims, 1 Drawing Sheet

SILICA COMPOSITE OXIDE PARTICLES AND METHOD OF PRODUCING THE SAME

BACKGROUND OF THE INVENTION

1. Field of the Invention

The present invention relates to spherical silica composite oxide particles having a high degree of monodispersion property comprising silica and a metal oxide other than silica. More specifically, the invention relates to novel silica composite oxide particles containing a metal oxide other than silica in an amount in a range of from 30 to 50 mol %, that could not be produced thus far.

2. Description of the Related Art

Spherical silica particles having a high degree of monodispersion property can be produced by using, as a starting material, a metal alkoxide such as tetraethoxy silane or tetramethoxy silane, and hydrolyzing and condensing the metal alkoxide in a water-containing organic solvent containing a catalyst. It is also allowable to produce so-called silica composite oxide particles such as of silica-titania, silica-alumina or silica-zirconia by using the above alkoxide of silicon and an alkoxide of a metal other than silicon as starting materials (hereinafter, the above methods of production are called sol-gel methods).

The silica composite oxide particles produced by the sol-gel method is capable of exhibiting a variety of characteristic properties that could not be obtained by using the silica only as a result of forming a composite of various kinds of metal oxides with silica as a main component. By varying the blending ratio of silica and a metal oxide other than silica, for example, the refractive index of particles can be freely adjusted while maintaining optical transparency, which is an excellent feature that could not be observed otherwise.

The silica composite oxide particles of which the refractive index is adjusted as described above are very useful as a filler when it is attempted to obtain a composite thereof with a resin. For example, Japanese Examined Patent Publication (Kokoku) No. 33721/2001 discloses a dental composite resin featuring improved abrasion resistance, surface luster and aesthetic appearance (transparency) by blending a polymerizable vinyl monomer with the above silica composite oxide particles. Further, Japanese Unexamined Patent Publications (Kokai) Nos. 65475/2004 and 41544/2005 disclose transparent composite resins suppressing the coefficient of thermal expansion by obtaining composites thereof with an epoxy resin.

In the above conventional examples of application, however, a sufficiently high refractive index could not be obtained when the content of a metal oxide other than silica was not larger than 20 mol %, since the refractive index of the resin component that is to be blended with the silica composite oxide particles was not substantially larger than 1.57. According to the conventional methods, further, when it is attempted to synthesize a component by containing the metal oxide other than silica in an amount in excess of 20 mol %, the particles coagulate together or fine particles are newly formed during the synthesis, making it difficult to obtain spherical silica composite oxide particles having a favorable monodispersion property.

Japanese Examined Patent Publication (Kokoku) No. 33721/2001 teaches that it is desired to suppress the constituent ratio of a metal oxide other than silica to be generally not larger than 30 mol % and, particularly, not larger than 20 mol % when it is intended to obtain a spherical inorganic oxide, and that excellently spherical particles having uniform sizes are obtained when the constituent ratio of a metal oxide other than the silica is selected to lie in a range of from 0.01 to 15 mol %. Besides, working examples of the above known literatures teach that the content of the metal oxide other than the silica in the silica composite oxide particles is 24 mol % at the greatest.

SUMMARY OF THE INVENTION

The present invention provides silica composite oxide particles having a high degree of monodispersion property containing a metal oxide other than silica in an amount of not smaller than 30 mol %, and a method of producing the same.

The present inventors have forwarded keen study in an effort to solve the above problems. As a result, the inventors have discovered that silica composite oxide particles having a high degree of monodispersion property can be synthesized even by using a metal oxide other than silica in an amount of not smaller than 30 mol % by conducting the partial hydrolysis of an alkoxide of silicon under optimum conditions in a very narrow range in preparing a composite alkoxide which is a starting material, i.e., in preparing the composite alkoxide comprising silicon and an alkoxide of a metal other than silicon, and have completed the present invention.

According to the present invention, there is provided silica composite oxide particles comprising silica and a metal oxide other than silica, the content of the metal oxide other than silica being from 30 to 50 mol %, and a coefficient of variation in the particle diameter being not larger than 30%.

According to the present invention, there is further provided a method of producing silica composite oxide particles by partially hydrolyzing a silicon alkoxide with water followed by mixing with an alkoxide of a metal other than silicon to prepare an alkoxide composition, and hydrolyzing and condensing said alkoxide composition in a water-containing organic solvent containing a catalyst for hydrolysis, wherein the partial hydrolysis of the silicon alkoxide is conducted the alkoxide of a metal other than silicon is used so as to satisfy a condition represented by the following formula (1), $$-0.06X+3.5<Y<-0.06X+4.5 \tag{1}$$

wherein X is a ratio (mol %) of the amount of the alkoxide of a metal other than silicon to the amount of the whole alkoxides and is a number of from 30 to 50, and Y is the amount of water used for the partial hydrolysis of the silicon alkoxide and is an equivalent of the water to the alkoxide of the metal other than silicon.

Figure 1:
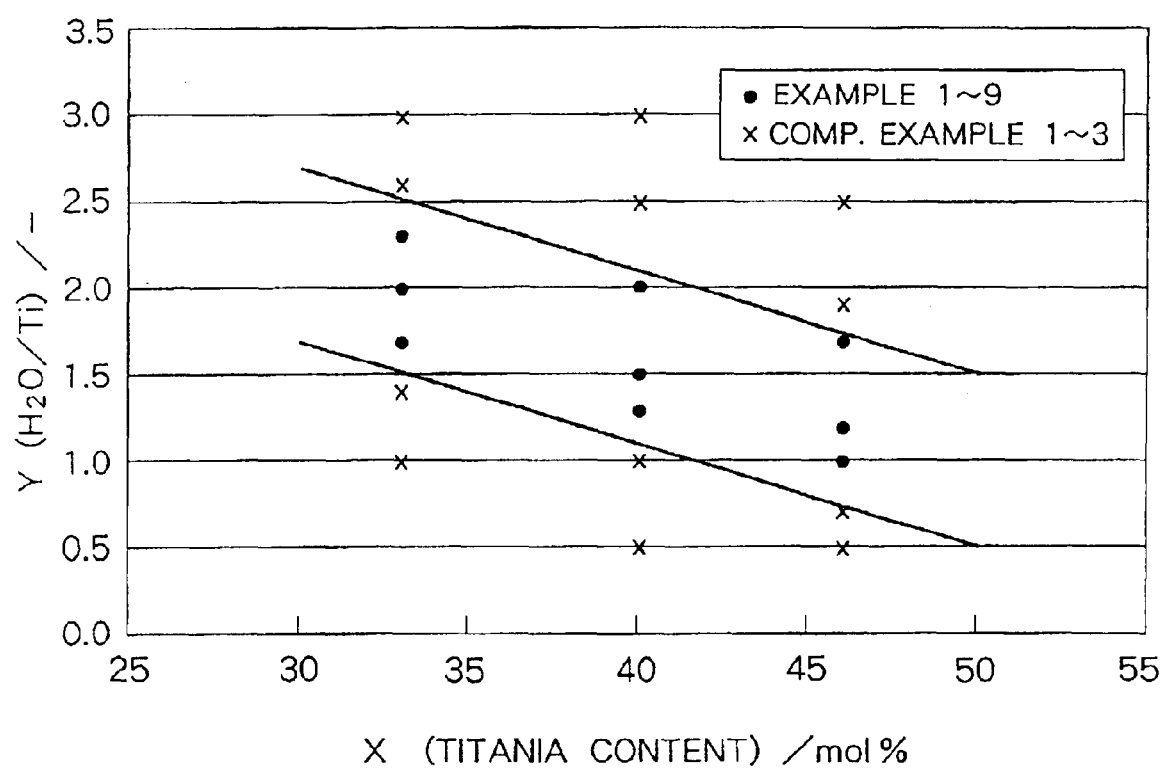
FIG. 1 is a diagram illustrating a relationship between the ratio (mol %) of the amount of an alkoxide of a metal other than silicon to the amount of the whole alkoxides and the amount of water used for the partial hydroxylis of the silicon alkoxide (equivalent of water to the alkoxide of the metal other than silicon).

DETAILED DESCRIPTION OF THE INVENTION (Silica Composite Oxide Particles)

In the present invention, there is no particular limitation on the kind of the metal oxide other than silica incorporated in the silica composite oxide. There can be used any metal oxide that bonds to the silica component to form spherical particles having a high degree of monodispersion property.

In order to combine, for example, the silica composite oxide particles of the invention with a resin to use the particles as a composite material that requires transparency, it is desired that the metal oxide itself has a high degree of transparency. There can be preferably used an oxide of a metal such as lithium, sodium, potassium, magnesium, calcium, strontium, barium, scandium, yttrium, titanium, zirconium, germanium, hafnium, boron, aluminum, tin or lead. When it is desired to obtain the spherical silica composite oxide particles having a high degree of monodispersion property, it is further desired to use an oxide of a metal of the Group 4 of periodic table among the oxides of the above metals. When it is intended to obtain the spherical silica composite oxide particles having a higher degree of monodispersion property, it is desired to use titania and/or zirconia among the oxides of metals of the Group 4 of periodic table.

The above metal oxide may be combined in a single kind with silica, or a plurality of metal oxides may be combined with silica. For example, the silica composite oxide particles of a silica-titania-zirconia three system may be obtained by using both titania and zirconia as metal oxides other than silica. In addition to the above, there can be exemplified silica composite oxide particles of such three systems as silica-titania-sodium oxide, silica-zirconia-sodium oxide and silica-alumina-titania. Further, if an optical activity is increased by adding oxides of rare earth elements such as Nd, Ce, Er, Tb and Tm in small amounts, then, the silica composite oxide particles can be applied to a very small spherical laser or the like.

The silica composite oxide particles of the invention contains a metal oxide other than silica in an amount in a range of from 30 to 50 mol %. If the mol number of silicon constituting silica is denoted by Si and the mol number of a metal element constituting the metal oxide by M, then, the content of the metal oxide referred to here is expressed as M/(Si+M)×100. In the case of the silica composite oxide particles of the three systems described above, M stands for a total mol number of the metal oxides other than silica.

When the content of the metal oxide is smaller than 30 mol %, the spherical silica composite oxide particles having a high degree of monodispersion property can be produced even by a conventional method. According to the present invention, the method of production was improved in an effort to produce the spherical silica composite oxide particles having a high degree of monodispersion property containing the metal oxide in an amount in a range of from 30 to 50 mol %, which could not be produced thus far. When the content of the metal oxide exceeds 50 mol %, the monodispersion property decreases and the particles tend to coagulate making the production difficult.

The present invention provides the spherical silica composite oxide particles featuring excellent monodispersion property and having a coefficient of variation in the particle diameter of not larger than 30%, preferably, not larger than 20% and, more preferably, not larger than 10%. The particles having a spherical shape make it possible to lower the viscosity of the composite resin and to increase the filling ratio of the particles in the resin at the time of being filled in the resin. With the coefficient of variation in the particle diameter being not larger than 30%, further, silica composite oxide particles can be filled in the resin to a high degree without spoiling the transparency.

The silica composite oxide particles of the present invention can be confirmed for their particulate shapes by using a scanning type or transmission type electron microscope. Further, the average particle diameter of the particles and the monodispersion property thereof (coefficient of variation in the particle diameter) can be measured by analyzing the electron microscope image or by using a highly precise particle size analyzer. Preferably, the average particle diameter, coefficient of variation in the particle diameter and circularity $[(4\pi \times area)/(circumferential\ length)^2]$ can be found by analyzing the electron microscope image by using a commercially available image analyzer.

The average particle diameter of the silica composite oxide particles of the invention is in a range of from 0.05 to several tens of microns, preferably, from 0.05 to several microns and, more preferably, from 0.05 to 1 micron. When it is attempted to produce the silica composite oxide particles having an average particle diameter of not smaller than 1 micron, an extended period of time is required and, besides, it becomes difficult to maintain the monodispersion property. The circularity which is an index of the particle shape is not smaller than 0.6, preferably, not smaller than 0.7 and, more preferably, not smaller than 0.8.

In the silica composite oxide particles of the present invention, the constituent components of silica and of the metal oxide other than silica are usually chemically bonded together. Therefore, these constituent components cannot be physically separated apart. The fact that the two components are chemically bonded together can be confirmed by measuring the infrared spectrum and the refractive index (optical transparency of the particles).

There is no particular limitation on the specific surface area of the silica composite oxide particles of the invention. Usually, the particles are used being fired at a temperature in a range of from 500 to 1300° C. When fired at high temperatures, the specific surface area tends to decrease and when dried at low temperatures, the specific surface area tends to increase. When fired at a temperature in excess of 1300° C., the particles are often sintered to spoil the monodispersion property.

The composite oxide particles of the present invention are mostly amorphous but are often a mixture of amorphous ones and partly crystalline ones. When the firing temperature is low, the composite oxide particles tend to become amorphous. When fired at higher temperatures, the metal oxide other than silica often becomes partly crystalline. In general, these properties can be analyzed by such means as X-ray diffraction. When it is attempted to utilize optically transparent properties of the particles, in general, it is desired that the particles are amorphous or are transformed into crystalline only very partly. For this purpose, it is desired that the firing temperature is not higher than 1100° C., preferably, not higher than 1050° C. and, more preferably, not higher than 1000° C.

The density and refractive index of the silica composite oxide particles of the present invention vary depending upon the kind and content of the metal oxide other than the silica and upon the temperature for firing the particles, and cannot be exclusively stated. Most generally, however, the density lies in a range of from 1.5 to 5 g/cm³ and the refractive index lies in a range of from 1.4 to 3. As for the silica-titania composite oxide particles having a high degree of transparency and excellent monodispersion property, for example, the density lies in a range of from 2.6 to 3.0 g/cm³ and the refractive index lies in a range of from 1.65 to 1.85 when the composite oxide particles having a titania content in a range of from 30 to 50 mol % are fired at 1000° C.

The silica composite oxide particles of the invention which could not be produced so far are spherical highly refractive particles having a high degree of monodispersion property, and are very useful as an additive to the antireflection layers and to the transparent resins. The diameters of the particles having a high degree of monodispersion property of the present invention may be brought into agreement with the wavelength (about 0.4 to 0.8 μm) of visible light, so that they may exhibit optical features that had not been known so far. For example, the particles containing the titania as one of the constituent components are also useful as a photocatalyst. It is further expected that the highly refractive particles can be applied as photonic crystals.

(Production of Silica Composite Oxide Particles)

If briefly described, the silica composite oxide particles of the present invention are produced by hydrolyzing and condensing an alkoxide composition (hereinafter often called starting alkoxide) containing a silicon alkoxide and an alkoxide of a metal other than silicon in a water-containing organic solvent containing a catalyst for hydrolysis, and are obtained as spherical particles having a high degree of monodispersion property.

Here, the organic solvent in the water-containing organic solvent may be alcohols such as methanol, ethanol, propanol, isopropanol, butanol, ethylene glycol and propylene glycol; ketones such as acetone and methyl ethyl ketone; ethers such as dioxane and tetrahydrofurane; esters such as ethyl acetate; and organic solvents compatible with water, which may be used in one kind or being mixed together in a plurality of kinds. Among them, lower alcohols such as methanol, ethanol and isopropanol are very preferably used since they are highly compatible with the starting alkoxide or water, and have low viscosities. The organic solvent is contained at a ratio of from about 3 to 95% and, preferably, from 60 to 90% in the water-containing organic solvent that contains the catalyst.

As the catalyst for hydrolyzing the starting alkoxide, there can be preferably used an amine such as $N(CH_3)_3$ or a base such as ammonia, LiOH, NaOH, KOH or $N(CH_3)_4OH$. In particular, the ammonia and amine are very desirably used as catalysts for hydrolysis since there remains no base in the particles once the silica composite oxide particles that are produced are fired. The amount of catalyst to be added cannot be exclusively stated since it differs depending upon the kind of the catalyst that is used, kind of the organic solvent and the ratio of water in the water-containing organic solvent. It is, however, desired that the catalyst is added in such an amount that the pH becomes not smaller than 10 and, preferably, not smaller than 11. In the case of ammonia which is most desired as the catalyst, the amount is from 2 to 10% and, preferably, from 3 to 7% in terms of weight percentage of $NH_3$.

The ratio of water in the water-containing organic solvent that contains the catalyst cannot be exclusively stated since it varies depending upon the kind of alkoxide that is used. Preferably, however, the water is contained in an amount in a range of from 3 to 95%, preferably, from 5 to 40% and, more preferably, from 5 to 20%.

As the silicon alkoxide and other metal alkoxide used for the preparation of the starting alkoxide, there can be used any compounds provided they turn into metal oxides through the hydrolysis in the above water-containing organic solvent that contains the catalyst.

From the standpoint of easily obtaining on an industrial scale, the silicon alkoxide is preferably the one represented by the following general formula,

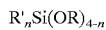

wherein R and R' are alkyl groups, and n is an integer of 0 to 3.

The above silicon alkoxides can be used in a single kind or in a combination of two or more kinds. In the above general formula, the alkyl group is preferably a lower alkyl group having not more than 4 carbon atoms, such as methyl group, ethyl group or butyl group.

As the alkoxide of a metal other than silicon, there can be used, without any limitation, the alkoxides of metals of the Groups 1, 2, 3, 4, 13 and 14 of periodic table. For example, it is desired to use metal alkoxides represented by the general formula $M^1(OR)$, $M^2(OR)_2$, $M^3(OR)_3$, $M^4(OR)_4$, $M^{13}(OR)_3$ or $M^{14}(OR)_4$ (wherein R is an alkyl group and, particularly preferably, the one having not more than 4 carbon atoms). Here, $M^1$ is a metal of the Group 1, $M^2$ is a metal of the Group 2, $M^3$ is a metal of the Group 3, $M^4$ is a metal of the Group 4, $M^{13}$ is a metal of the Group 13, and $M^{14}$ is a metal of the Group 14. Concretely, there can be preferably used lithium, sodium, potassium, magnesium, calcium, strontium, barium, scandium, yttrium, titanium, zirconium, hafnium, boron, aluminum, germanium, tin or lead. Concrete examples of the compound that can be generally favorably used in the invention include organic sodium compounds such as $NaOCH_3$, $NaOC_2H_5$ and $NaOC_3H_7$ as well as compounds of the Group 1 substituted with Li and K instead of Na above; organic magnesium compounds such as $Mg(OCH_3)_2$, $Mg(OC_2H_5)_2$, $Mg(OC_3H_7)_2$, $Mg(OC_4H_9)_2$ and $Mg(OC_5H_{11})_2$ as well as compounds of the Group 2 substituted with Ca, Sr and Ba instead of Mg above; compounds such as $Ti(OisoC_3H_7)_4$ and $Ti(OnC_4H_9)_4$ as well as compounds of the Group 4 or the Group 14 substituted with Zr, Hf, Ge, Sn and Pb instead of Ti above; and compounds such as $Al(OC_2H_5)_3$, $Al(OC_3H_7)_3$ and $Ai(OC_4H_9)_3$ as well as compounds of the Group 3 or the Group 13 substituted with Sc, Y and B instead of Al above. In addition to the alkoxides, there can be further used such compounds as acetates and acetoacetates of the above metals, and $CaCl_2$, $Ca(HOC_6H_4COO)_2 \cdot H_2O$.

When it is attempted to obtain the spherical silica composite oxide particles having a high degree of monodispersion property, it is desired to use an alkoxide of a metal of the Group 4 of periodic table among the above compounds. Among them, it is most desired to use the alkoxide of titanium and/or zirconium.

In the present invention, the starting alkoxide is prepared by mixing the above silicon alkoxide and an alkoxide of a metal other than silicon. Here, it is very important that the silicon alkoxide is partially hydrolyzed and is then mixed with other metal alkoxide, and that the amount of water used for the partial hydrolysis and the amount of the other metal alkoxide satisfy a predetermined condition. By employing the above means, it is allowed to obtain spherical silica composite oxide particles (having a high degree of circularity) with a coefficient of variation in the particle diameter of not higher than 30% despite of the fact that the metal oxide other than silica is contained in an amount as large as 30 mol % or more.

That is, in the present invention, the silanol group has been formed in the molecules since the silicon alkoxide is partially hydrolyzed in advance, and the starting alkoxide containing an alkoxide of a metal other than silicon is condensed in the presence of the silanol group. It is, therefore, considered that a composite alkoxide of silicon and of a metal other than silicon is formed due to the reaction of the silanol group with the alkoxide of the metal other than silicon, that the hydrolysis and condensation proceed through the composite alkoxide and, as a result, agglomeration or coagulation of particles is effectively suppressed despite there are contained alkoxides of metals other than silicon in large amounts, making it possible to obtain composite oxide particles in which silica and the metal oxide other than silica are combined together. When, for example, the silicon alkoxide which has not been partially hydrolyzed is mixed with other metal alkoxides to conduct the hydrolysis and condensation, the above-mentioned composite alkoxide is not formed. When other metal alkoxides are used in large amounts, the particles melt-adhere together or coagulate, and the silica is not sufficiently combined with metal oxides other than the silica.

In order to produce the silica composite oxide particles containing the metal oxides other than the silica in amounts of from 30 to 50 mol %, it is necessary that the metal alkoxides other than silicon are used in amounts of from 30 to 50 mol % with respect to the total alkoxides (total amount of silicon alkoxide and other metal alkoxides). In the present invention, it is most important that the other metal alkoxides are used in amounts, relative to the amount of water used for the partial hydrolysis of the silicon alkoxide, satisfying the condition represented by the following formula (1), $$-0.06X+3.5 < Y < -0.06X+4.5 \quad (1)$$

and, preferably, satisfying the condition represented by the following formula (2), $$-0.06X+3.7 < Y < -0.06X+4.3 \quad (2)$$

wherein X is a ratio (mol %) of the amount of the alkoxide of a metal other than silicon to the amount of the whole alkoxides and is a number of from 30 to 50, and Y is the amount of water used for the partial hydrolysis of the silicon alkoxide and is an equivalent of the water to the alkoxide of a metal other than silicon.

As will be obvious from the above formulas (1) and (2), the amount X of the alkoxide of a metal other than silicon must be selected to lie within a very limited range with respect to the amount Y of water used for the partial hydrolysis of the silicon alkoxide. In other words, the amount of water used for the partial hydrolysis of the silicon alkoxide must be selected to lie within a limited range depending upon the composition (content of other metal oxides) of the object silica composite oxide particles. This is because the hydrolysis and condensation presumably proceed through the composite alkoxide.

When, for example, the amount of water is smaller than, or greater than, the above range in partially hydrolyzing the alkoxide of silicon, it becomes difficult to control the reaction in obtaining the silica composite oxide particles by hydrolyzing and condensing the above starting material in the water-containing organic solvent that contains the catalyst, permitting the formation of fine particles, causing the particles to be adhered a lot and, in an extreme case, causing the particles to be coagulated together while the particles are being synthesized.

In partially hydrolyzing the silicon alkoxide, it is desired to also use an organic solvent such as alcohol which is compatible with both the alkoxide and water. When the organic solvent such as alcohol is not used, the silicon alkoxide and water tend to undergo the phase separation, and it often happens that the partial hydrolysis does not proceed or the reaction becomes very slow. In order to quickly proceed the partial hydrolysis, further, a catalyst is desirably added to water. An acid is preferably used as the catalyst. Concretely, there can be used hydrochloric acid, sulfuric acid, nitric acid and oxalic acid though there is no particular limitation. It is desired that the acid is used at such a concentration that water possesses the pH in a range of from 1 to 4.

In the production method of the present invention, the silicon alkoxide is partially hydrolyzed with water and is mixed with an alkoxide of a metal other than silicon to prepare a starting alkoxide which is, then, hydrolyzed and condensed in a water-containing organic solvent (hereinafter also called reaction solution) containing the above catalyst to obtain the silica composite oxide particles.

It is desired that the starting alkoxide is added dropwise into the solution. The dropwise addition into the solution stands for that the end of a dropping port has been immersed in the reaction solution at the time of adding the starting alkoxide dropwise into the reaction solution. There is no particular limitation on the position of the end of the dropping port provided it is immersed in the solution. It is, however, desired that the position of the end of the dropping port is close to impellers where the stirring is effected to a sufficient degree. When, for example, the starting alkoxide is added dropwise onto the reaction solution instead of into the reaction solution, the particles tend to coagulate, which is not desirable.

Further, the starting alkoxide and a separately prepared alkaline aqueous solution may be simultaneously added dropwise into the water-containing organic solvent containing the catalyst. As the alkaline aqueous solution, there can be preferably used 10 to 30% by weight of ammonia water. It is desired that the alkaline aqueous solution is added dropwise at such a feeding ratio that the mol number of water in the alkaline aqueous solution is 1 to 6 times of mols and, preferably, 2 to 5 times of mols with respect to the total mole number of the silicon in the starting alkoxide and of the metals other than silicon. The alkaline aqueous solution needs not be added dropwise into the solution. When added dropwise into the solution near impellers, however, the alkaline aqueous solution is stirred in the reaction solution to a sufficient degree, which is desirable. Upon simultaneously adding the alkaline aqueous solution dropwise as described above, the particles can be synthesized maintaining a high slurry concentration and, hence, maintaining a high yield.

The rate of dropwise addition also serves as an important factor for improving the monodispersion property. The monodispersion property tends to be heightened when the rate of dropwise addition is small. When the rate of dropwise addition is small, however, an extended period of time is required before the synthesis ends, which is not practicable. Therefore, maintaining the dropwise addition small in the initial stage of synthesis and increasing the drowise addition in the latter half, constitute a preferred embodiment of the present invention.

It is desired that the starting alkoxide and the alkaline aqueous solution are added dropwise and continuously from the start of the dropwise addition until the end of the dropwise addition. Here, the word "continuous" has a meaning in that there does not exist an interval of, preferably, not longer than 10 minutes and, more preferably, not longer than 3 minutes. The rate of dropwise addition needs not necessarily remain constant. When the rate of dropwise addition is to be varied, however, it is desired that the rate is continuously varied. Japanese Unexamined Patent Publication (Kokai) No. 77309/1992 teaches adding the water being divided into several times. With this method, however, a sudden addition of water disturbs the atmosphere in the reaction solution, causing the particles to be coagulated together and fine particles to be newly formed, which are not desirable.

The temperature of the reaction vessel when the hydrolysis is to be conducted may be in a range of from 0 to 50° C. and can be suitably selected depending upon the kind of the alkoxide that is used.

The reaction vessel for the hydrolysis and the reaction conditions other than those described above, may be those of known ones without any limitation.

The thus synthesized particles are spherical silica composite oxide particles containing metal oxides other than silica in amounts of from 30 to 50 mol % and having a coefficient of variation in the particle diameter of not larger than 30%.

The particles after the synthesis are obtained in the form of a colloidal particle dispersion being dispersed in the reaction solution. Depending upon the use, the dispersion may be used in its own form or may be used after the solvent in the reaction solution is substituted with water or with an organic solvent such as alcohol.

Further, the particles that have been synthesized may be recovered in the form of a powder through the solid-liquid separation such as centrifugal separation, filtering, distillation or spray-drying. The powder that is recovered can be dried. The drying temperature is preferably in a range of from 50 to 300° C. and the drying time is preferably from several hours to several days. The powder after drying can be fired at a higher temperature. The firing temperature is preferably in a range of from 300 to 1300° C. and the firing time is preferably from 1 to 24 hours. The particles after drying or firing can be milled into individual particles by using a ball mill or a jet mill. When the particles are to be used being dispersed in a resin or the like, a high-shear dispersing machine is used to disperse the particles in the resin while milling the particles.

The method of the present invention makes it possible to obtain spherical silica composite oxide particles having a very high monodispersion property containing metal oxides other than silica in an amount of from 30 to 50 mol %, which could not be produced thus far. In particular, the silica composite oxide particles blended with titania or zirconia as a metal oxide other than silica, exhibit a high degree of monodispersion property and easily assume a spherical shape. The above optically highly transparent and highly refractive particles are very useful as an additive to the antireflection layers, to the highly refractive resins and to the films.

EXAMPLES

The invention will now be concretely described by way of Examples to which only, however, the invention is in no way limited.

(Method of Measuring Properties of Particles)

The average particle diameter and the coefficient of variation in the particle diameter were found through the analysis of 200 or more particles by using an image of a scanning-type electron microscope and an image analyzer. The circularity of particles was also found from the image data.

The refractive index of particles was found by the immersion method. That is, solvents having different refractive indexes (e.g., toluene, 1-bromonaphthalene, 1-chloronaphthalene, diiodemethane, sulfur-containing diiodemethane, etc.) were suitably blended together to prepare a mixed solvent having any refractive index, and in which the particles were dispersed. A refractive index of the particle dispersion that was most transparent at 25° C. was regarded to be the refractive index of the particles. The refractive index of the solvent was measured at 25° C. by using Abbe's refractometer.

The density of the particles was measured by using a densitometer (Accupick 1330 manufactured by Micromellitex Co.) in compliance with the gas substitution method.

The crystalline form of the particles was identified by using an X-ray diffractometer.

Example 1

Isopropanol and ammonia water (25% by weight) were fed in amounts of 480 g and 120 g, respectively, into a glass reactor of a volume of 4 liters equipped with impellers, and were stirred at 100 rpm while maintaining the reaction solution at a temperature of 40° C.

Next, 408 g of a tetramethoxysilane ($Si(OMe)_4$, Colcoat Co., trade name: Methyl Silicate 39) was fed into a 3-liter Erlenmeyer flask followed by the addition of 254 g of methanol and 47.6 of an aqueous solution (pH 2.1) containing 0.035% by weight of hydrochloric acid with stirring. The mixture was stirred for about 10 minutes to partially hydrolyze the tetramethoxysilane. At this moment, the solution has observed heat generated by the hydrolysis of the tetramethoxysilane. Analysis by using GC/MS proved the hydrolysis of a methoxy group of the tetramethoxysilane and the formation of $Si(OMe)_3(OH)$.

Then, a solution obtained by diluting 375 g of a titanium tetraisopropoxide ($Ti(O\text{-}iPr)_4$, Nihon Soda Co., Trade name: A-1) with 400 g of isopropanol, was added thereto to obtain a colorless and transparent homogeneous solution (composite alkoxide of Si and Ti).

The amount of water used for the partial hydrolysis of the tetramethoxysilane was 2.0 equivalents for the titanium tetraisopropoxide. From the composition of feed, further, the blending ratio of the titanium tetraisopropoxide was 33 mol % with respect to the mol number of the sum of the tetramethoxysilane and the titanium tetraisopropoxide.

When the content of the metal oxide other than the silica is 33 mol %, the equivalent of the amount of water required for the partial hydrolysis as found from the formula (1) is not smaller than 1.52 but is smaller than 2.52 with respect to the metal alkoxide other than the silica.

Silica composite oxide particles were synthesized by simultaneously adding dropwise, into the reaction solution, about 1480 g of the above composite alkoxide solution (starting material) at a rate of 0.3 g/min and 320 g of ammonia water (25% by weight) as an alkaline aqueous solution at a rate of 0.1 g/min. After the start of the dropwise addition, the rates of dropwise addition of the starting material and of the alkaline aqueous solution were gradually increased, and the whole amounts were added dropwise over a period of 5 hours.

After the dropwise addition has been finished, the stirring was continued for 30 minutes and, then, the solution was taken out. The solution weighed about 2400 g. After the filtration and drying, there were recovered 261 g of particles. Therefore, the slurry concentration when the particles were prepared was about 11%.

Observation of the obtained particles through the scanning-type electron microscope revealed that the particles obviously assumed the spherical shape. As a result of analyzing the image, the average particle diameter was 0.25 µm, the coefficient of variation in the particle diameter was 8.7% and the circularity of the particles was 0.88.

Some of the particles after drying were fired at 1000° C. for 4 hours. Observation of the fired particles through the scanning-type electron microscope revealed that the average particle diameter has decreased by about 7% but other values were nearly the same as those described above. The density was 2.67 $g/cm^3$ and the refractive index was 1.70. As a result of X-ray diffraction, the dried particles were amorphous. From the particles fired at 1000° C. was detected a peak near 25.2° stemming from the anatase-type titania. It was therefore learned that the fired particles were spherical particles in which fine crystals of titania had been dispersed in the silica matrix.

Example 2

Silica composite oxide particles containing the titania in an amount of 33 mol % were synthesized in the same manner as in Example 1 but using the aqueous solution containing 0.035% by weight of hydrochloric acid, necessary for the partial hydrolysis, in an amount of 1.7 equivalents for the titanium tetraisopropoxide.

Observation of the obtained particles through the scanning-type electron microscope revealed that the particles obviously assumed the spherical shape. As a result of analyzing the image, the average particle diameter was 0.25 μm, the coefficient of variation in the particle diameter was 8.6% and the circularity of the particles was 0.88.

Some of the particles after drying were fired at 1000° C. for 4 hours. Observation of the fired particles through the scanning-type electron microscope revealed that the average particle diameter has decreased by about 7% but other values were nearly the same as those described above. The density was 2.67 g/cm$^3$ and the refractive index was 1.70. As a result of X-ray diffraction, the dried particles were amorphous. From the particles fired at 1000° C. was detected a peak near 25.2° stemming from the anatase-type titania. It was therefore learned that the fired particles were spherical particles in which fine crystals of titania had been dispersed in the silica matrix.

Example 3

Silica composite oxide particles containing the titania in an amount of 33 mol % were synthesized in the same manner as in Example 1 but using the aqueous solution containing 0.035% by weight of hydrochloric acid, necessary for the partial hydrolysis, in an amount of 2.3 equivalents for the titanium tetraisopropoxide.

Observation of the obtained particles through the scanning-type electron microscope revealed that the particles obviously assumed the spherical shape. As a result of analyzing the image, the average particle diameter was 0.25 μm, the coefficient of variation in the particle diameter was 8.7% and the circularity of the particles was 0.85.

Some of the particles after drying were fired at 1000° C. for 4 hours. Observation of the fired particles through the scanning-type electron microscope revealed that the average particle diameter has decreased by about 7% but other values were nearly the same as those described above. The density was 2.65 g/cm$^3$ and the refractive index was 1.70. As a result of X-ray diffraction, the dried particles were amorphous. From the particles fired at 1000° C. was detected a peak near 25.2° stemming from the anatase-type titania. It was therefore learned that the fired particles were spherical particles in which fine crystals of titania had been dispersed in the silica matrix.

Example 4

Isopropanol and ammonia water (25% by weight) were fed in amounts of 540 g and 60 g, respectively, into a glass reactor of a volume of 4 liters equipped with impellers, and were stirred at 100 rpm while maintaining the reaction solution at a temperature of 40° C.

Next, 365 g of a tetramethoxysilane (Si(OMe)$_4$, Colcoat Co., trade name: Methyl Silicate 39) was fed into a 3-liter Erlenmeyer flask followed by the addition of 307 g of methanol and 43.2 g of an aqueous solution (pH 2.1) containing 0.035% by weight of hydrochloric acid with stirring. The mixture was stirred for about 10 minutes to partially hydrolyze the tetramethoxysilane. At this moment, the solution has observed heat generated by the hydrolysis of the tetramethoxysilane.

Then, a solution obtained by diluting 455 g of a titanium tetraisopropoxide (Ti(O-iPr)$_4$, Nihon Soda Co., Trade name: A-1) with 480 g of isopropanol, was added thereto to obtain a colorless and transparent homogeneous solution (composite alkoxide of Si and Ti).

The amount of water used for the partial hydrolysis of the tetramethoxysilane was 1.5 equivalents for the titanium tetraisopropoxide. From the composition of feed, further, the blending ratio of the titanium tetraisopropoxide was 40 mol % with respect to the mol number of the sum of the tetramethoxysilane and the titanium tetraisopropoxide.

When the content of the metal oxide other than the silica is 40 mol %, the equivalent of the amount of water required for the partial hydrolysis as found from the formula (1) is not smaller than 1.10 but is smaller than 2.10 with respect to the metal alkoxide other than the silica.

Silica composite oxide particles were synthesized by simultaneously adding dropwise, into the reaction solution, about 1652 g of the above composite alkoxide solution (starting material) at a rate of 0.3 g/min and 380 g of ammonia water (25% by weight) as an alkaline aqueous solution at a rate of 0.1 g/min. After the start of the dropwise addition, the rates of dropwise addition of the starting material and of the alkaline aqueous solution were gradually increased, and the whole amounts were added dropwise over a period of 6 hours.

After the dropwise addition has been finished, the stirring was continued for 30 minutes and, then, the solution was taken out. The solution weighed about 2600 g. After the filtration and drying, there were recovered 265 g of particles. Therefore, the slurry concentration when the particles were prepared was about 10%.

Observation of the obtained particles through the scanning-type electron microscope revealed that the particles obviously assumed the spherical shape. As a result of analyzing the image, the average particle diameter was 0.45 μm, the coefficient of variation in the particle diameter was 14.7% and the circularity of the particles was 0.85.

Some of the particles after drying were fired at 1000° C. for 4 hours. Observation of the fired particles through the scanning-type electron microscope revealed that the average particle diameter has decreased by about 7% but other values were nearly the same as those described above. The density was 2.78 g/cm$^3$ and the refractive index was 1.75. As a result of X-ray diffraction, the dried particles were amorphous. From the particles fired at 1000° C. was detected a peak near 25.2° stemming from the anatase-type titania. It was therefore learned that the fired particles were spherical particles in which fine crystals of titania had been dispersed in the silica matrix.

Example 5

Silica composite oxide particles containing the titania in an amount of 40 mol % were synthesized in the same manner as in Example 4 but using the aqueous solution containing 0.035% by weight of hydrochloric acid, necessary for the partial hydrolysis, in an amount of 1.3 equivalents for the titanium tetraisopropoxide.

Observation of the obtained particles through the scanning-type electron microscope revealed that the particles obviously assumed the spherical shape. As a result of analyzing the image, the average particle diameter was 0.45 μm, the coefficient of variation in the particle diameter was 8.0% and the circularity of the particles was 0.87.

Some of the particles after drying were fired at 1000° C. for 4 hours. Observation of the fired particles through the scanning-type electron microscope revealed that the average particle diameter has decreased by about 7% but other values were nearly the same as those described above. The density was 2.76 g/cm$^3$ and the refractive index was 1.75. As a result of X-ray diffraction, the dried particles were amorphous. From the particles fired at 1000° C. was detected a peak near 25.2° C. stemming from the anatase-type titania. It was therefore learned that the fired particles were spherical particles in which fine crystals of titania had been dispersed in the silica matrix.

Example 6

Silica composite oxide particles containing the titania in an amount of 40 mol % were synthesized in the same manner as in Example 4 but using the aqueous solution containing 0.035% by weight of hydrochloric acid, necessary for the partial hydrolysis, in an amount of 2.0 equivalents for the titanium tetraisopropoxide.

Observation of the obtained particles through the scanning-type electron microscope revealed that the particles obviously assumed the spherical shape. As a result of analyzing the image, the average particle diameter was 0.40 μm, the coefficient of variation in the particle diameter was 13.8% and the circularity of the particles was 0.89.

Some of the particles after drying were fired at 1000° C. for 4 hours. Observation of the fired particles through the scanning-type electron microscope revealed that the average particle diameter has decreased by about 7% but other values were nearly the same as those described above. The density was 2.75 g/cm$^3$ and the refractive index was 1.75. As a result of X-ray diffraction, the dried particles were amorphous. From the particles fired at 1000° C. was detected a peak near 25.2° stemming from the anatase-type titania. It was therefore learned that the fired particles were spherical particles in which fine crystals of titania had been dispersed in the silica matrix.

Example 7

Isopropanol, methanol and ammonia water (25% by weight) were fed in amounts of 200 g, 700 g and 100 g, respectively, into a glass reactor of a volume of 4 liters equipped with impellers, and were stirred at 100 rpm while maintaining the reaction solution at a temperature of 40° C.

Next, 329 g of a tetramethoxysilane (Si(OMe)$_4$, Colcoat Co., trade name: Methyl Silicate 39) was fed into a 3-liter Erlenmeyer flask followed by the addition of 354 g of methanol and 39.8 g of an aqueous solution (pH 2.1) containing 0.035% by weight of hydrochloric acid with stirring. The mixture was stirred for about 10 minutes to partially hydrolyze the tetramethoxysilane. At this moment, the solution has observed heat generated by the hydrolysis of the tetramethoxysilane.

Then, a solution obtained by diluting 523 g of a titanium tetraisopropoxide (Ti(O-iPr)$_4$, Nihon Soda Co., Trade name: A-1) with 553 g of isopropanol, was added thereto to obtain a colorless and transparent homogeneous solution (composite alkoxide of Si and Ti).

The amount of water used for the partial hydrolysis of the tetramethoxysilane was 1.2 equivalents for the titanium tetraisopropoxide. From the composition of feed, further, the blending ratio of the titanium tetraisopropoxide was 46 mol % with respect to the mol number of the sum of the tetramethoxysilane and the titanium tetraisopropoxide.

When the content of the metal oxide other than the silica is 46 mol %, the equivalent of the amount of water required for the partial hydrolysis as found from the formula (1) is not smaller than 0.74 but is smaller than 1.74 with respect to the metal alkoxide other than the silica.

Silica composite oxide particles were synthesized by simultaneously adding dropwise, into the reaction solution, about 1800 g of the above composite alkoxide solution (starting material) at a rate of 0.3 g/min and 420 g of ammonia water (25% by weight) as an alkaline aqueous solution at a rate of 0.1 g/min. After the start of the dropwise addition, the rates of dropwise addition of the starting material and of the alkaline aqueous solution were gradually increased, and the whole amounts were added dropwise over a period of 8 hours.

After the dropwise addition has been finished, the stirring was continued for 30 minutes and, then, the solution was taken out. The solution weighed about 3200 g. After the filtration and drying, there were recovered 255 g of particles. Therefore, the slurry concentration when the particles were prepared was about 8%.

Observation of the obtained particles through the scanning-type electron microscope revealed that the particles obviously assumed the spherical shape. As a result of analyzing the image, the average particle diameter was 0.11 μm, the coefficient of variation in the particle diameter was 18.3% and the circularity of the particles was 0.79.

Some of the particles after drying were fired at 1000° C. for 4 hours. Observation of the fired particles through the scanning-type electron microscope revealed that the average particle diameter has decreased by about 10% but other values were nearly the same as those described above. The density was 2.88 g/cm$^3$ and the refractive index was 1.80. As a result of X-ray diffraction, the dried particles were amorphous. From the particles fired at 1000° C. was detected a peak near 25.2° stemming from the anatase-type titania. It was therefore learned that the fired particles were spherical particles in which fine crystals of titania had been dispersed in the silica matrix.

Example 8

Silica composite oxide particles containing the titania in an amount of 46 mol % were synthesized in the same manner as in Example 7 but using the aqueous solution containing 0.035% by weight of hydrochloric acid, necessary for the partial hydrolysis, in an amount of 1.0 equivalent for the titanium tetraisopropoxide.

Observation of the obtained particles through the scanning-type electron microscope revealed that the particles obviously assumed the spherical shape. As a result of analyzing the image, the average particle diameter was 0.13 μm, the coefficient of variation in the particle diameter was 18.5% and the circularity of the particles was 0.77.

Some of the particles after drying were fired at 1000° C. for 4 hours. Observation of the fired particles through the scanning-type electron microscope revealed that the average particle diameter has decreased by about 7% but other values were nearly the same as those described above. The density was 2.88 g/cm$^3$ and the refractive index was 1.80. As a result of X-ray diffraction, the dried particles were amorphous. From the particles fired at 1000° C. was detected a peak near 25.2° stemming from the anatase-type titania. It was therefore learned that the fired particles were spherical particles in which fine crystals of titania had been dispersed in the silica matrix.

Example 9

Silica composite oxide particles containing the titania in an amount of 46 mol % were synthesized in the same manner as in Example 7 but using the aqueous solution containing 0.035% by weight of hydrochloric acid, necessary for the partial hydrolysis, in an amount of 1.7 equivalents for the titanium tetraisopropoxide.

Observation of the obtained particles through the scanning-type electron microscope revealed that the particles obviously assumed the spherical shape. As a result of analyzing the image, the average particle diameter was 0.11 μm, the coefficient of variation in the particle diameter was 18.8% and the circularity of the particles was 0.75.

Some of the particles after drying were fired at 1000° C. for 4 hours. Observation of the fired particles through the scanning-type electron microscope revealed that the average particle diameter has decreased by about 7% but other values were nearly the same as those described above. The density was 2.89 g/cm$^3$ and the refractive index was 1.80. As a result of X-ray diffraction, the dried particles were amorphous. From the particles fired at 1000° C. was detected a peak near 25.2° stemming from the anatase-type titania. It was therefore learned that the fired particles were spherical particles in which fine crystals of titania had been dispersed in the silica matrix.

Comparative Example 1

Silica composite oxide particles containing the titania in an amount of 33 mol % were synthesized in the same manner as in Example 1 but using the aqueous solution containing 0.035% by weight of hydrochloric acid, necessary for the partial hydrolysis, in amounts of 1.0 equivalent, 1.4 equivalents, 2.6 equivalents and 3.0 equivalents for the titanium tetraisopropoxide.

However, there were formed fine particles during the synthesis, and, finally, the particles have coagulated as a whole making it difficult to synthesize the spherical silica composite oxide particles having a high degree of monodispersion property.

Comparative Example 2

Silica composite oxide particles containing the titania in an amount of 40 mol % were synthesized in the same manner as in Example 4 but using the aqueous solution containing 0.035% by weight of hydrochloric acid, necessary for the partial hydrolysis, in amounts of 0.5 equivalents, 1.0 equivalent, 2.5 equivalents, and 3.0 equivalents for the titanium tetraisopropoxide.

However, there were formed fine particles during the synthesis, and, finally, the particles have coagulated as a whole making it difficult to synthesize the spherical silica composite oxide particles having a high degree of monodispersion property.

Comparative Example 3

Silica composite oxide particles containing the titania in an amount of 46 mol % were synthesized in the same manner as in Example 7 but using the aqueous solution containing 0.035% by weight of hydrochloric acid, necessary for the partial hydrolysis, in amounts of 0.5 equivalents, 0.7 equivalents, 1.9 equivalents and 2.5 equivalents for the titanium tetraisopropoxide.

However, there were formed fine particles during the synthesis, and, finally, the particles coagulated as a whole making it difficult to synthesize the spherical silica composite oxide particles having a high degree of monodispersion property.

The results of Examples 1 to 9 and Comparative Examples 1 to 3 are summarized in FIG. 1. "Black circles" represent points where the spherical silica composite oxide particles having a high degree of monodispersion property were synthesized, and "X" represents points where fine particles were formed in large amounts and coagulated during the synthesis making it difficult to synthesize the spherical silica composite oxide particles having a high degree of monodispersion property.

It will be learned from the above Examples and Comparative Examples that when the amount of water during the partial hydrolysis of the silicon alkoxide fails to satisfy the formula (1), there are not obtained spherical silica composite oxide particles having a high degree of monodispersion property.

Example 10

Isopropanol and ammonia water (25% by weight) were fed in amounts of 480 g and 120 g, respectively, into a glass reactor of a volume of 4 liters equipped with impellers, and were stirred at 100 rpm while maintaining the reaction solution at a temperature of 40° C.

Next, 408 g of a tetramethoxysilane (Si(OMe)$_4$, Colcoat Co., trade name: Methyl Silicate 39) was fed into a 3-liter Erlenmeyer flask followed by the addition of 254 g of methanol and 47.6 g of an aqueous solution (pH 2.1) containing 0.035% by weight of hydrochloric acid with stirring. The mixture was stirred for about 10 minutes to partially hydrolyze the tetramethoxysilane. At this moment, the solution has observed heat generated by the hydrolysis of the tetramethoxysilane.

Then, a solution obtained by diluting 588 g of a zirconium tetrabutoxide (Zr(O-Bu)$_4$, Nihon Soda Co., Trade name: TBZr, purity of 86.2% by weight) with 400 g of isopropanol, was added thereto to obtain a colorless and transparent homogeneous solution (composite alkoxide of Si and Zr).

The amount of water used for the partial hydrolysis of the tetramethoxysilane was 2.0 equivalents for the zirconium tetrabutoxide. From the composition of feed, further, the blending ratio of the zirconium tetrabutoxide was 33 mol % with respect to the mol number of the sum of the tetramethoxysilane and the zirconium tetrabutoxide.

When the content of the metal oxide other than the silica is 33 mol %, the equivalent of the amount of water required for the partial hydrolysis as found from the formula (1) is not smaller than 1.52 but is smaller than 2.52 with respect to the metal alkoxide other than the silica.

Silica composite oxide particles were synthesized by simultaneously adding dropwise, into the reaction solution, about 1690 g of the above composite alkoxide solution (starting material) at a rate of 0.3 g/min and 300 g of ammonia water (25% by weight) as an alkaline aqueous solution at a rate of 0.1 g/min. After the start of the dropwise addition, the rates of dropwise addition of the starting material and of the alkaline aqueous solution were gradually increased, and the whole amounts were added dropwise over a period of 8 hours.

After the dropwise addition has been finished, the stirring was continued for 30 minutes and, then, the solution was taken out. The solution weighed about 2550 g. After the filtration and drying, there were recovered 318 g of particles. Therefore, the slurry concentration when the particles were prepared was about 12%.

Observation of the obtained particles through the scanning-type electron microscope revealed that the particles obviously assumed the spherical shape. As a result of analyzing the image, the average particle diameter was 0.33 μm, the coefficient of variation in the particle diameter was 23.3% and the circularity of the particles was 0.75.

Some of the particles after drying were fired at 1000° C. for 4 hours. Observation of the fired particles through the scanning-type electron microscope revealed that the average particle diameter has decreased by about 8% but other values were nearly the same as those described above. The density was 3.36 g/cm$^3$ and the refractive index was 1.64. As a result of X-ray diffraction, the dried particles were amorphous. From the particles fired at 1000° C. was detected a peak near 30.1° stemming from tetragonal zirconia. It was therefore learned that the fired particles were spherical particles in which fine crystals of zirconia had been dispersed in the silica matrix.

FIG. 1 illustrates a relationship between the content (mol %) of metal oxides other than the silica calculated from the above Examples and comparative Examples, and the amount of water used for the partial hydrolysis (equivalents of water for the metal alkoxides other than silicon).

What is claimed is:

1. Silica composite oxide particles comprising silica and a metal oxide other than silica, wherein the content of the metal oxide other than silica is from 30 to 50 mol %, and a coefficient of variation in the particle diameter being not larger than 30%, and wherein the silica and the metal oxide other than silica are present in a state that the metal oxide are dispersed in a matrix of silica with chemical bonding between silica and metal oxide.

2. Silica composite oxide particles according to claim 1, wherein the metal oxide other than silica is an oxide of a metal of the Group 4 of periodic table.

3. Silica composite oxide particles according to claim 2, wherein the metal oxide other than silica is titania and/or zirconia.

4. A method of producing silica composite oxide particles by partially hydrolyzing a silicon alkoxide with water followed by mixing with an alkoxide of a metal other than silicon to prepare an alkoxide composition, and hydrolyzing and condensing said alkoxide composition in a water-containing organic solvent containing a catalyst for hydrolysis, wherein the partial hydrolysis of the silicon alkoxide is conducted so as to satisfy a condition represented by the following formula (1), $$-0.06X+3.5<Y<-0.06X+4.5 \tag{1}$$

wherein X is a ratio (mol %) of the amount of the alkoxide of a metal other than silicon to the amount of the whole alkoxides and is a number of from 30 to 50, and Y is the amount of water used for the partial hydrolysis of the silicon alkoxide and is an equivalent of the water to the alkoxide of a metal other than silicon.

* * * * *